Figure 4:
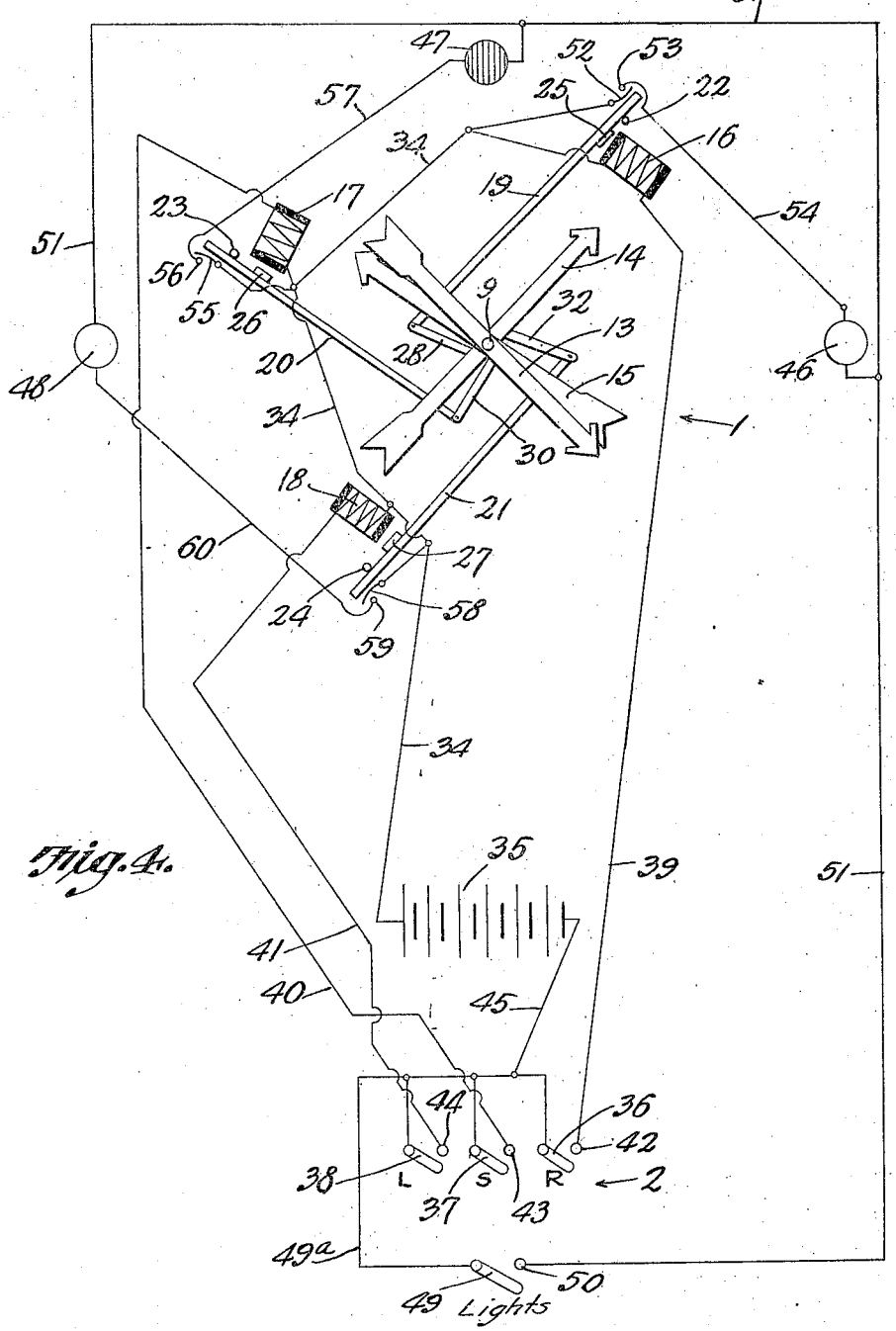

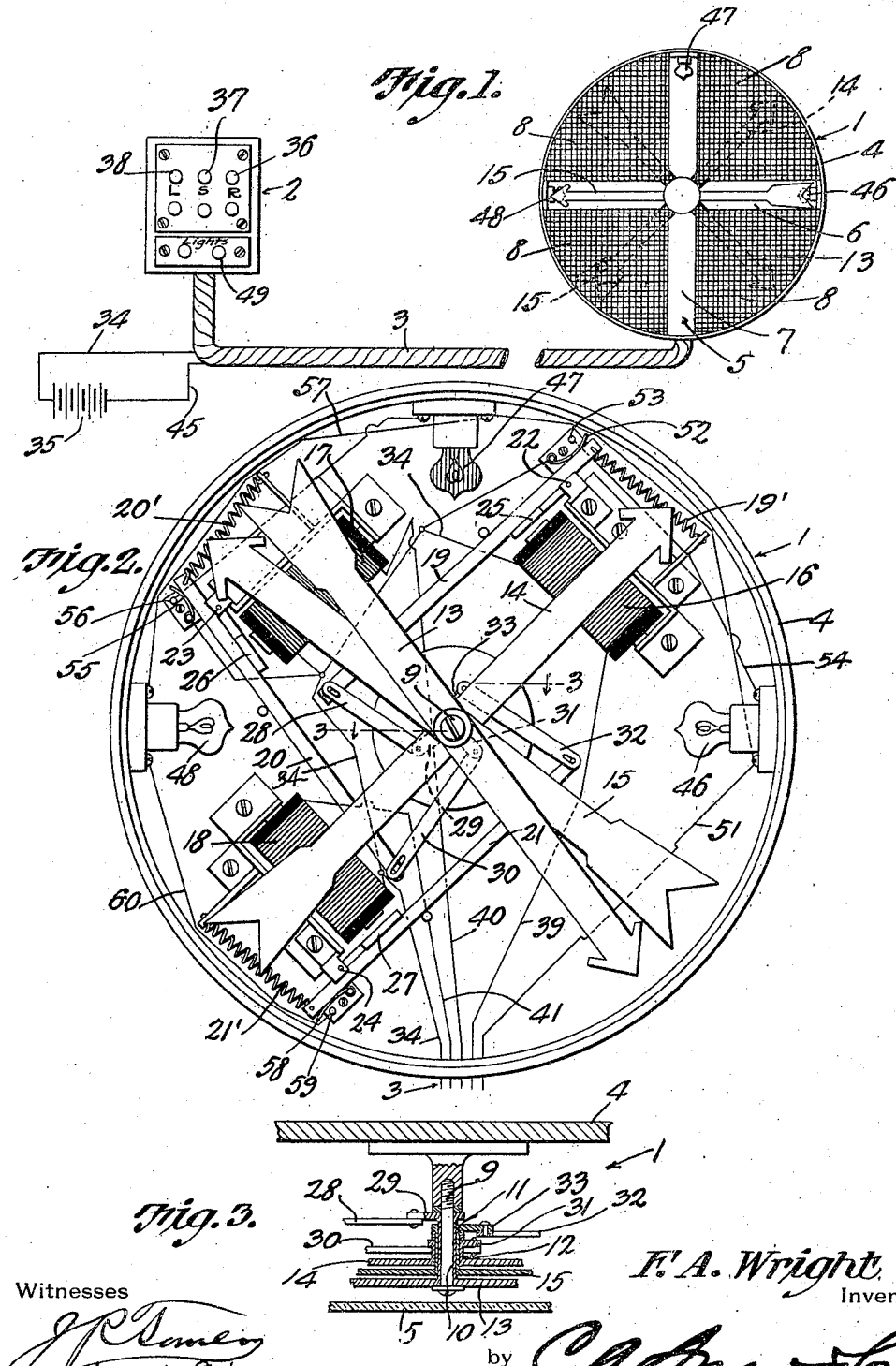

F. A. WRIGHT.
ELECTRIC AUTOMOBILE SIGNAL.
APPLICATION FILED APR. 3, 1915.

1,159,312.

Patented Nov. 2, 1915.
2 SHEETS—SHEET 2.

Witnesses

Inventor
F. A. Wright
by C. A. Snow & Co.
Attorneys

UNITED STATES PATENT OFFICE.

FREDERICK A. WRIGHT, OF SCRANTON, PENNSYLVANIA, ASSIGNOR OF ONE-HALF TO WALLIE J. BRONG, OF PECKVILLE, PENNSYLVANIA.

ELECTRIC AUTOMOBILE-SIGNAL.

1,159,312.  Specification of Letters Patent.  Patented Nov. 2, 1915.

Application filed April 3, 1915. Serial No. 18,922.

*To all whom it may concern:*

Be it known that I, FREDERICK A. WRIGHT, a citizen of the United States, residing at Scranton, in the county of Lackawanna and State of Pennsylvania, have invented a new and useful Electric Automobile-Signal, of which the following is a specification.

The present invention appertains to automobile signals, such as embody signal devices adapted to be carried at the rear ends of automobiles for indicating whether the machines are to be turned to the right or left, or are to be stopped, in order that the occupants of a vehicle traveling in rear of another may be notified or forewarned of the fact that the preceding machine is about to turn to one side or the other or to stop.

It is the object of this invention to provide an electric automobile signal of the nature indicated, which is of novel and improved construction and operation in order that the contrivance will be useful in a high degree.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a view illustrating in elevation, the signal device and switch board, and cable connecting them, a portion of the cable being broken away and the source of electrical energy being illustrated diagrammatically. Fig. 2 is an enlarged elevation of the signal device with the face plate or panel removed. Fig. 3 is a sectional view taken on the line 3—3 of Fig. 2. Fig. 4 is a diagrammatical view of the signal system.

In carrying out the invention, there is provided a signal device 1 adapted to be attached in any suitable manner to the rear end or other suitable portion of an automobile whereby the signal device will be conspicuous from the rear; and a switch board 2 for controlling the signal device is attached to the dash board or other suitable portion of the machine where it will be accessible by the operator. The signal device 1 and switch board 2 are electrically connected and the electric conductors are assembled or inclosed within a cable 3 connecting the signal device and switch board.

The signal device 1 comprises a case 4 which is preferably, although not necessarily, circular in contour, and which is provided with a glass or equivalent face plate or panel 5. The face plate or panel 5 is provided with a horizontal diametrical transparent portion or slot 6, and with a vertical diametrical transparent portion or slot 7. The portions 8 between slots 6 and 7 are blackened by means of paint or are rendered opaque in any other suitable manner to hide the arrows or pointers when they are in idle position, and to hide the working parts of the signal device. The slots 6 and 7 are for the purpose of exposing the pointers or indicia when they are swung to operative position, and said slots 6 and 7 also expose the signal lights which are employed at night time or in darkness in connection with the pointers.

The back of the case 4 is provided with a forwardly projecting spindle 9 which extends toward the intersection of the slots 6 and 7 centrally of the case. The sleeve 10 is journaled upon the spindle 9, and a sleeve 11 is journaled upon the sleeve 10, while a third sleeve 12 is journaled upon the sleeve 11. The sleeve 11 is shorter than the sleeve 10 and the sleeve 12 is shorter than the sleeve 11. To the forward or outermost ends of the respective sleeves 10, 11 and 12 are attached the signal pointers or indicia 13, 14 and 15 which are preferably shaped in the form of arrows. The pointers 13, 14 and 15 are normally arranged at an angle between the slots 6 and 7 so as to be hidden from view when they are idle.

The three pointers are electro-magnetically operated, and to this end, three electromagnets 16, 17 and 18 are attached to the back of the case 4 in rear of the respective opaque portions 8 of the face plate or panel 5, and operating levers 19, 20 and 21 are fulcrumed as at 22, 23 and 24, respectively, adjacent the electro-magnets 16, 17 and 18. The levers 19, 20 and 21 carry the respective armatures 25, 26 and 27 coöperating with and adapted to be attracted by the respective electro-magnets 16, 17 and 18 when the electro-magnets are energized. The inner or long arm of the lever 19 is connected by means of a link 28 to a radially projecting

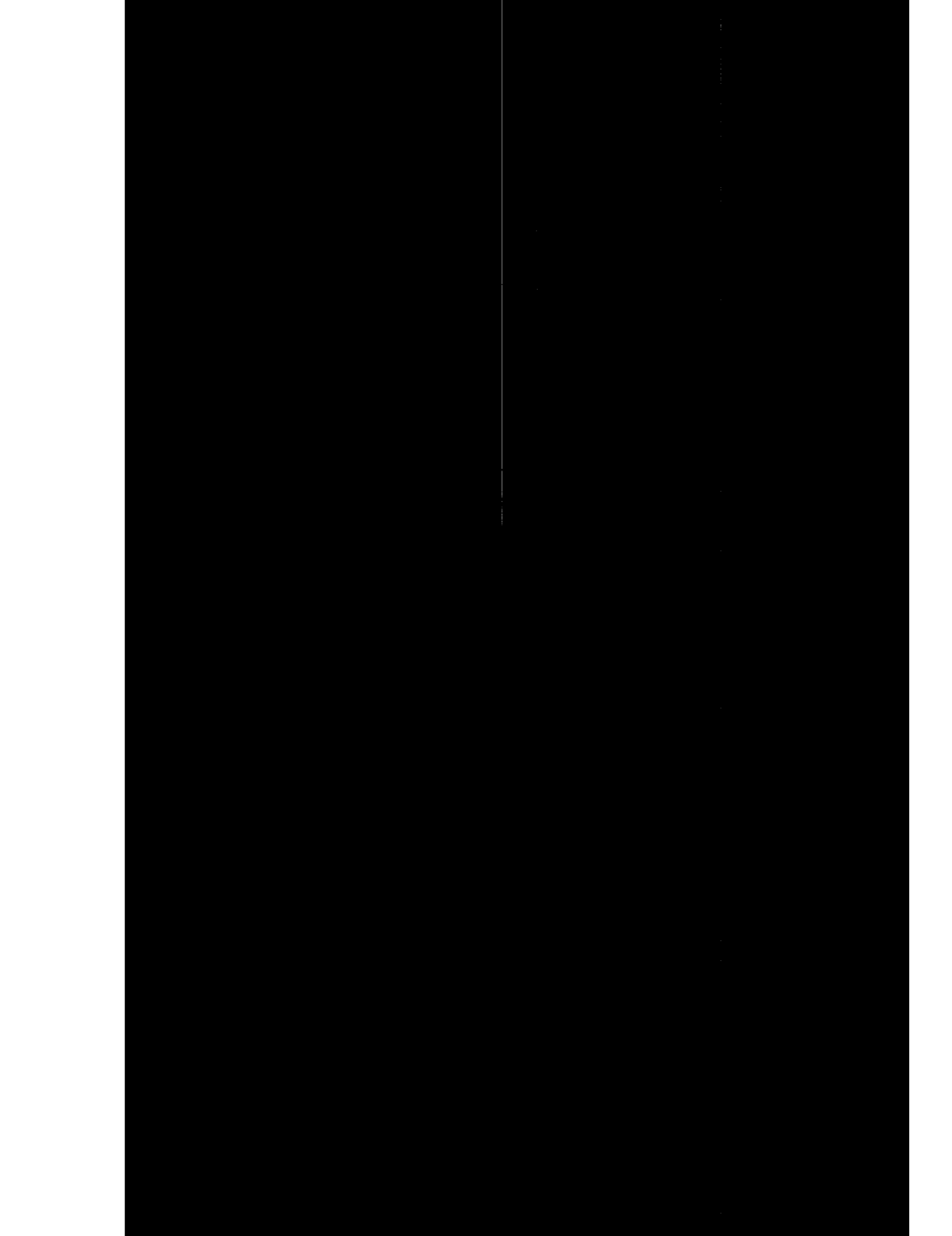

chine is about to be steered to the right. When the switch 36 is released or opened, the pointer 13 will be returned to idle position under the influence of the spring 19' connected to the armature lever 19. Similarly, when the machine is to be steered to the left, the switch 38 is closed which establishes an electrical circuit from the battery 35 through the conductor 45, switch 38, conductor 41, electromagnet 18 and conductor 34 back to the battery, thus energizing the electro-magnet 18 and swinging the armature lever 21 to thereby swing the "left hand" pointer 15 behind the slot 6 so as to point to the left. When the driver or operator is about to stop the machine, and to prevent a collision, the traffic in rear is signaled the fact by closing the "stop" switch 37 which establishes an electrical circuit from the battery 35 through the conductor 45, switch 37, conductor 40, electro-magnet 17 and conductor 34 back to the battery. The electro-magnet 17 being energized will swing the "stop" pointer 14 to vertical position behind the slot 7 of the case 4 to indicate that the machine is about to be stopped or slowed down.

During the night time or darkness, the signal lamps or lights are employed in connection with the pointers. Thus, the switch 49 is closed during darkness, when it is desired to operate the signal lamps in connection with the pointers. The switches 52, 55 and 58 of the lamps being normally opened will extinguish the lamps ordinarily. Now, supposing the "right hand" switch 36 to be closed for operating the armature lever 19 to swing the "right hand" pointer 13 to signaling position, the lever 19 will swing the spring switch 52 to closed position against the contact 53, and this will establish a circuit from the battery 35 through the conductor 45, conductor 49ª, switch 49, conductor 51, lamp 46, conductor 54, contact 53, switch 52, and conductor 34 back to the battery. Consequently, the "right hand" lamp 46 would be lighted and would illuminate the pointed end or arm of the pointer 14 so that the pointer could be properly seen, and furthermore, the lamp 46 being arranged at the right hand end of the slot 6 would indicate to persons in rear that the machine is about to be turned to the right. In the same manner, when the "left hand" switch 38 is closed for operating the "left hand" pointer 15, the corresponding armature lever 21 being swung will close the spring switch 58. This will establish an electrical circuit from the battery 35 through the conductor 45, conductor 49ª, switch 49, contact 50, conductor 51, lamp 48, conductor 60, contact 59, switch 58, and conductor 34 back to the battery. The "left hand" lamp 48 is thus lighted for illuminating the "left hand" pointer and to assist in signaling the intention of the operator or driver to those in rear. When the "stop" switch 37 is closed to operate the "stop" pointer, the respective armature lever 20 will swing the switch 55 to closed position, and this will establish an electrical circuit from the battery 35 through the conductor 45, conductor 49ª, switch 49, contact 50, conductor 51, lamp 47, conductor 57, contact 56, switch 55, and conductor 34 back to the battery. The "stop" or red lamp 47 at the upper end of the slot 7 is thus lighted for illuminating the "stop" pointer and for indicating the fact that the machine is about to be stopped or slowed down.

The lamps may be immediately rendered inoperative by opening the light controlling switch 49, so that the signal pointers 13, 14 and 15 will operate independently of the lights.

The present signal apparatus provides a convenient and efficient means whereby the operator or driver of an automobile may signal to the traffic in rear, his intentions to turn to the right or left, or to stop. The mechanism operates in a practical manner, and the signal device is operative to indicate in a desirable manner, the intentions of the operator.

It will be noted that the pointers 13, 14 and 15 are all pivotally mounted upon the spindle 9, to rotate about a common axis, and it will be evident that when the respective armature levers 19, 20 and 21 are attracted by the electromagnets, they will transmit the oscillatory motion by means of the respective links 28, 30 and 32 to the arms 29, 31 and 33 of the respective sleeves 10, 12 and 11. When any of the armature levers is swung by the attraction to the respective electro-magnet, the respective sleeve carrying one pointer will be swung to move the pointer to signaling position.

Although the signal device is adapted particularly for use on motor vehicles, it may also be used as a railroad, street car or crossing signal, or the like.

Having thus described the invention, what is claimed as new is:

1. In a signal apparatus, a case having intersecting slots, and a spindle at the intersection of said slots, a plurality of sleeves journaled one upon the other and upon the spindle, a pointer carried by each sleeve, the pointers normally lying in idle position between the slots, and actuating means operatively connected to each sleeve for swinging the respective pointer to signaling position behind one of the slots.

2. In a signal apparatus, a case having intersecting slots, and a spindle at the intersection of said slots, a plurality of sleeves journaled one upon the other and upon the spindle, a pointer carried by each sleeve, the pointers normally lying in idle position between the slots, an electro-magnet within the case for each pointer, an armature lever coöperating with each electromagnet and connected operatively with one of said sleeves, and means whereby each electromagnet may be individually energized, for swinging the respective pointer to signaling position behind one of said slots.

3. In a signal apparatus, a case having horizontal and vertical slots, a spindle within the case at the intersection of the slots, a plurality of sleeves journaled one upon the other and upon said spindle, a pointer carried by each sleeve, the pointers being normally positioned between the slots, an electromagnet within the case for each pointer, an armature lever coöperating with each electro-magnet and connected operatively to one sleeve whereby when the armature lever is attracted by the electromagnet it will swing the respective pointer to displaying position behind one slot, means for individually energizing the electro-magnets, electric signal lamps mounted within the case at the ends of the slots, and a normally open switch connected to each lamp and coöperating with the respective armature lever to be closed when the armature lever is swung for swinging the respective pointer to signaling position.

In testimony that I claim the foregoing as my own, I have hereto affixed my signature in the presence of two witnesses.

FREDERICK A. WRIGHT.

Witnesses:
 R. E. HOUSER,
 C. W. HOUSER.